Dec. 22, 1964  R. BENNETT  3,162,327
CAPLESS PLASTIC SNIP-TIP BOTTLE
Filed May 19, 1961
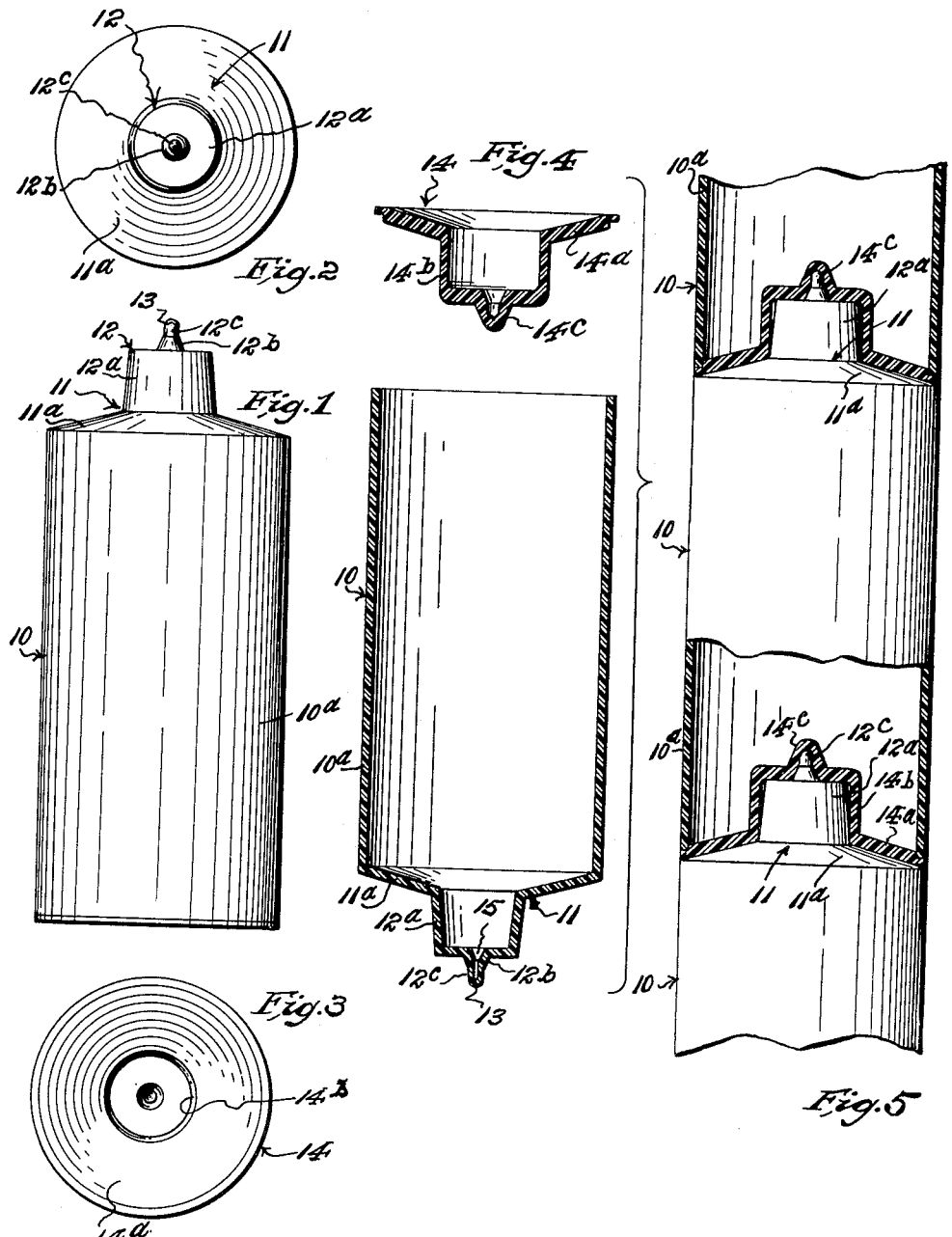
INVENTOR.
RONALD BENNETT,
BY Richards & Cifelli,
Attorneys

United States Patent Office 3,162,327
Patented Dec. 22, 1964

3,162,327
CAPLESS PLASTIC SNIP-TIP BOTTLE
Ronald Bennett, Livingston, N.J., assignor to Fluid Chemical Company, Inc., Newark, N.J., a corporation of New Jersey
Filed May 19, 1961, Ser. No. 111,316
1 Claim. (Cl. 222—143)

This invention relates in general to bottles and has particular reference to bottles having dispensing necks provided with snip-tips and made entirely of plastic material.

Prior to my present invention, snip-tip bottles required a screw cap to close and seal the orifice in the neck tip after the latter had been snipped off, because the orifice necessarily had to be large enough in diameter to permit filling of the bottle therethrough. The provision of a cap with internal screw threads and mated screw threads on the neck of the bottle adds very materially to the cost of manufacture.

It, therefore, is the primary object of my present invention to provide a snip-tip plastic bottle of such construction that it can be filled faster with its intended contents and can have a dispensing orifice of very small diameter which need not be closed by a screw cap and allows dripless dispensing.

To be more explicit, my improved snip-tip bottle includes a tubular body and a head at its top, both of which may easily be formed as an integral structure by the blow molding or injection molding of thermoplastics or resins, or by the extrusion or pressure molding of thermosetting plastics or resins. The head includes a dispensing neck with snip-tip which projects axially upwardly from the upper end of the tubular body and has an axial orifice that communicates with the interior of the body but is closed initially at its upper end by a top wall. In this manner, the bottle body, head and neck with snip-tip are closed except at the bottom upon completion of the first step of the molding process. The final step consists in heat sealing a disk-like bottom wall in closing relation to the bottom end of the body, but the body is first inverted and filled through the said large cross-section bottom end.

Another object of the invention is to utilize as the bottom wall of the bottle body a specially molded plastic element that is dished upwardly to conform to the configuration of the head and snip-tip neck, so that the bottles may conveniently be stacked in storage or on display shelves.

Further objects, advantages and features will become apparent as the following specific description is read in connection with the accompanying drawing, in which:

FIG. 1 is a side elevation of the completed bottle prior to snipping of the dispensing tip.

FIG. 2 is a top end view;

FIG. 3 is a bottom end view;

FIG. 4 is an exploded vertical cross-sectional view of the two separately molded component units, showing the same inverted for filling of the body and subsequent heat-sealing of the bottom wall to the body; and FIG. 5 is a fragmentary side elevation, partly in vertical section, of three stacked bottles.

Referring now in detail to the drawings, wherein like reference characters designate corresponding parts in the several views, the complete bottle in fluid-filled condition with snip-tip neck intact is shown in FIGS. 1 to 3, inclusive. The bottle comprises: a tubular body 10, preferably of circular cross-section; a head 11 which closes the top of body 10 and includes an elongated dispensing neck 12 having a snip-tip with an axial orifice in communication with the interior of said body but which is closed by a top wall 13; and a bottom wall 14.

Initially, body 10 and head 11 are produced by a suitable molding process as an integral unit. Bottom wall 14 is produced as a separate unit and subsequently heat-sealed to the previously open bottom end of body 10 after the latter has been filled with the intended fluid contents. It should be apparent to persons skilled in the plastic molding art, after reading the further details of construction enumerated hereinbelow, that the two principal units of my improved plastic bottle are susceptible of manufacture by blow molding or injection molding of thermoplastics or resins, or by the extrusion or pressure molding of thermosetting plastics or resins, at low cost, primarily because of the omission of any screwthreaded cap for the dispensing neck.

Suitable materials for molding the component units include, but not to the exclusion of other substances, both natural and synthetic plastics and resins, such as polyvinyls, polyethylenes, polystyrenes, cellulose acetate, polypropyienes and phenol formaldehyde.

Referring particularly to FIGS. 1 and 4, head 11 includes an annular head wall proper 11a which merges at its perimeter with the cylindrical side wall 10a of body 10. The slope of head wall proper 11a is at a very slight angle of deviation from the horizontal. Dispensing neck 12, which has a wall thickness substantially the same as that of head wall proper 11a and side wall 10a of body 10, includes a graduated series of upwardly tapered frusto-conical portions 12a and 12b. The degree of taper is just sufficient to afford draft when neck 12 is nested inside the correspondingly shaped bottom wall 14 of an adjoining bottle in a stack (FIG. 5). A snip-tip portion 12c of slender cylindrical form projects upward from frusto-conical portion 12b and has an orifice 15 in communication with the interior of body 10 which is initially closed by top wall 13. It is this tip portion 12c which is to be snipped off when it is desired to dispense the fluid contents of the bottle, thus its greatly reduced diameter.

In the stacking of bottles of my improved construction, the dispensing neck of each one functions as the male member thereof for nested engagement within the bottom wall 14 of an adjoining bottle. It is for that reason that bottom wall 14 includes upwardly succeeding portions 14a, 14b and 14c corresponding in internal shape to the respective portions 11a, 12a and 12c of head 11 and having inside diameters substantially the same as the outside diameters of said head portions, whereby bottom wall 14 constitutes the female member of the bottle.

It should now be apparent that there are many advantages of my bottle construction over those of the prior art. Some of these advantages may be enumerated as follows:

a. No screw cap is necessary; the snip cap is used only for dispensing; the bottle is filled, while inverted through the bottom opening before the bottom wall is applied.

b. Two or more of the bottles may be stacked conveniently on a shelf.

c. The labelling of these bottles is facilitated because printing, screening or lithographing is relatively simple and inexpensive when following the commercial method of printing collapsible tubes.

d. The bottle can be either blow-molded or injection-molded; injection molding would reduce the cost of manufacture very materially.

While the invention has been illustrated and described with respect to a particular embodiment thereof, it will be understood that it is intended to cover all changes and modifications of the embodiment shown which do not constitute departures from the spirit of the invention and scope of the appended claim.

I claim:

A plastic bottle comprising, a molded upright one-piece tubular body having its bottom end initially open to permit filling therethrough with the intended contents when inverted, said body including a head molded in integral relation thereto, said head including an elongated axially upwardly projecting non-threaded dispensing neck with a snip-tip having an axial orifice therein in communication with the interior of said body, and an upper end wall closing said orifice to the atmosphere in such a manner that only the bottom end of the body is open initially, and a bottom wall heat-sealed to the bottom end of said body after the latter has been filled to permanently close the bottom of said bottle, wherein the dispensing neck forms a male nesting member and the bottom wall is indented to form a mated female nesting member and corresponding substantially in internal shape and diameter to the external shape and diameter of said dispensing neck to permit stacking of more than one bottle, the respective external and internal side surfaces of the dispensing neck and bottom wall being tapered upwardly at a divergence from cylindrical form just sufficient to afford draft.

References Cited by the Examiner

UNITED STATES PATENTS

| | | | |
|---|---|---|---|
| 266,906 | 10/82 | Sherwood | 215—10 |
| 769,171 | 9/04 | Kray | 215—10 |
| 2,588,604 | 3/52 | Archer | 53—39 |
| 2,742,202 | 4/56 | Dresden et al. | |
| 2,893,611 | 7/59 | Akers | 222—541 |
| 2,928,216 | 3/60 | Orsini | 53—39 X |
| 3,001,564 | 9/61 | Hopkins. | |
| 3,083,916 | 4/63 | Neel | 222—541 X |
| 3,100,592 | 8/63 | Orr | 222—541 X |

RAPHAEL M. LUPO, *Primary Examiner.*

LAVERNE D. GEIGER, LOUIS J. DEMBO,

*Examiners.*